(12) United States Patent
Rowe et al.

(10) Patent No.: US 8,472,971 B2
(45) Date of Patent: Jun. 25, 2013

(54) METHOD AND APPARATUS FOR DETERMINING WHETHER A MOBILE TERMINAL HAS MOVED OUTSIDE A GIVEN LOCALE

(75) Inventors: Robert Willem Rowe, Cambridge (GB); Peter James Duffett-Smith, Cambridge (GB)

(73) Assignee: Cambridge Positioning Systems Limited, Cambridge (GB)

( * ) Notice: Subject to any disclaimer, the term of this patent is extended or adjusted under 35 U.S.C. 154(b) by 1578 days.

(21) Appl. No.: 11/922,556

(22) PCT Filed: Jun. 12, 2006

(86) PCT No.: PCT/EP2006/063088
§ 371 (c)(1),
(2), (4) Date: Dec. 20, 2007

(87) PCT Pub. No.: WO2007/000389
PCT Pub. Date: Jan. 4, 2007

(65) Prior Publication Data
US 2009/0111482 A1  Apr. 30, 2009

(30) Foreign Application Priority Data
Jun. 27, 2005  (EP) .................................. 05253968

(51) Int. Cl.
*H04W 24/00*  (2009.01)
*H04B 7/212*  (2006.01)
*G01S 3/02*  (2006.01)

(52) U.S. Cl.
USPC ......... 455/456.1; 342/457; 342/464; 370/324

(58) Field of Classification Search
USPC ........................................ 455/456.1; 370/324
See application file for complete search history.

(56) References Cited

U.S. PATENT DOCUMENTS

| | | | | | |
|---|---|---|---|---|---|
| 5,969,679 | A | * | 10/1999 | Bolliger et al. | 342/464 |
| 5,970,414 | A | * | 10/1999 | Bi et al. | 455/456.3 |
| 2004/0202119 | A1 | * | 10/2004 | Edge | 370/324 |

FOREIGN PATENT DOCUMENTS

| | | |
|---|---|---|
| EP | 0303371 A | 2/1989 |
| WO | WO 97 11384 | 3/1997 |
| WO | WO 98/09467 A | 3/1998 |
| WO | WO 00 73813 A | 12/2000 |
| WO | WO 00 73814 A | 12/2000 |

\* cited by examiner

*Primary Examiner* — Charles Appiah
*Assistant Examiner* — Natasha Cosme
(74) *Attorney, Agent, or Firm* — Roylance, Abrams, Berdo & Goodman, LLP

(57) ABSTRACT

To determine whether a mobile terminal of a communications system has moved outside a locale, the terminal measures relative time offsets of signals received by the terminal from transmitters of the network, relative to each other or a reference. At a first time when the terminal is within a given locale, the time of receipt of signals received by the terminal from a plurality of the transmitters relative to a reference or each other are measured to create a first set of receive time offsets. At a second time, a second set of receive time offsets is measured. Change(s) in receive time offsets is/are calculated, and change(s) between the first and second times in transmission time offsets of the signals transmitted by at least one transmitter is/are obtained to determine movement indicators that are compared with threshold valuets to determine whether the mobile terminal has moved outside the locale.

23 Claims, 3 Drawing Sheets

METHOD AND APPARATUS FOR DETERMINING WHETHER A MOBILE TERMINAL HAS MOVED OUTSIDE A GIVEN LOCALE

FIELD OF TECHNOLOGY

The present invention relates to systems in which it is required to determine whether a mobile terminal has moved outside a given locale.

More specifically, the invention relates to commercial applications similar to or such as 'home zone billing' in which a lower tariff is charged for use of a mobile terminal on a network when the terminal is within the 'home zone' compared with the tariff charged for use outside it. Further applications include systems in which it is desired to check whether a remote terminal has moved outside a given locale, such as in offender-tracking, or child-monitoring, and other 'geo-fencing' applications.

BACKGROUND

Technology for positioning mobile radio terminals using the signals received from one or more transmitters has been widely used for many years. Such systems include terrestrial networks of transmitters (e.g. Loran) and networks of satellites (e.g. GPS and Galileo) deployed specifically for the purpose of locating the receiver, as well as methods that use general-purpose radio networks such as cellular mobile telephone networks (e.g. WO-A-97-11384) or TV and radio transmitter networks. (e.g. EP-A-0303371).

Within a cellular mobile telephone network, for example, the position of the terminal may be determined based on the identity of the serving cell, augmented by information such as the round trip time delay between the serving transmitter and terminal, the strengths of signals received from the serving and neighbouring transmitters, or angles of incidence of received signals. In such cases, the calculated position usually has a large error associated with it which can range from several hundreds of meters to many kilometers, depending on the density of the cellular transmitter network. An improved position may be obtained using the observed time difference of arrival (OTDA) of signals received at the terminal from two or more network transmitters.

OTDA methods give good position accuracy using only the signals available within the cellular radio network. However, they require the precise transmission time offsets between transmitters to be determined in order to solve the positioning equations. This has been done using location measuring units (LMUs) having additional receivers. LMUs are placed at known locations so that their OTDA measurements can be converted directly into a network timing model (see for example WO-A-00-73813).

Alternatively a technique and system (see WO-A-00-73814 and WO-A-00-73813) may be used in which measurements of signals from a number of geographically disparate cellular transmitters at known positions made, for example, by two or more geographically disparate terminals at unknown positions, may be used to compute both the positions of the terminals and all the timing offsets between the measured transmitters, without the need for LMUs. Terminals in the network make measurements of the relative time offsets of signals they receive from network transmitters and they send these to the computing node of the system (sometimes known as the 'Serving Mobile Location Centre', SMLC). The system maintains a timing model defining the timing relationships between transmitters in the cellular radio network using this background stream of terminal measurements, and continuously adjusts itself for the slow timing changes in the network. The system also computes the positions of the terminals.

The problem addressed by the present invention is that of determining whether a terminal is within a given locale, say within a few hundred meters of a given position, or whether it has moved outside of it. This could obviously be done by using any of the methods mentioned above to determine the position of the terminal. The calculated position is then compared with the given position. However, such a calculation (for example carried out in an SMLC remote from the terminal) generally has an appreciable communications overhead associated with it, both in the sizes of messages sent and received and in the latency times. In particular, it could take several seconds, or even tens of seconds, for the user of a terminal to establish whether or not he or she was within the given locale, which could hinder the commercial exploitation of a home-zone system. We have appreciated that for such uses it is unnecessary for a terminal's position to be calculated, merely the change in its position, and this can be achieved without the hindrance of the communications overhead.

U.S. Pat. No. 5,969,679 describes a method and apparatus for determining whether a wireless station is operating within a prescribed geographical region, specifically a terminal in a CDMA wireless communication system. One of the characteristics of a CDMA system or network is that the transmission times of the network's transmitters are predefined, unique to each transmitter and fixed, i.e. synchronised, and a terminal in such a system can determine the transmission times of the signals it receives from the transmitters by decoding the CDMA signals from the base station.

Unfortunately, in GSM or WCDMA communication systems, which comprise the majority of the cellular communication networks in use in the world today, the network's transmitters are unsynchronised with each other and with respect to any common timing reference, and the transmission times can also drift slowly over time. This means that in, for example GSM or WCDMA communication systems, the technique used in U.S. Pat. No. 5,969,679 (involving the use of the propagation delays and the difference in propagation delay between two transmitters) is unavailable because the propagation delays and the difference in propagation delay cannot be determined from the base station transmissions in such communication systems.

The problem to be overcome therefore is that of identifying one or more movement indicators which reflect movement of the terminal within the network without requiring that the network signal transmitters be synchronised or that the propagation delays be calculated.

SUMMARY OF THE INVENTION

According to the invention there is provided a method of determining whether a mobile terminal has moved outside a given locale, said terminal including a receiver able to measure the relative receive time offsets of the signals, received by the receiver from one or more transmission sources, relative to each other or to a reference, the method comprising the steps of
  (a) obtaining at a first time a first set of one or more receive time offsets corresponding to said receiver located at the centre of the locale;
  (b) measuring, at a second time when it is desired to determine whether the mobile terminal has moved outside said locale, a second set of one or more corresponding receive time offsets of the signals from at least one of the transmission sources, the receive time offset of which is included in the first set;

(c) calculating one or more movement indicators by subtracting the corresponding receive time offsets in the first and second sets from one another;

(d) if the transmission sources are unsynchronised, obtaining the change or changes, in transmission time offsets of the signals transmitted by at least one transmission source relative to a reference or to another transmission source, between the first and second times, and adding or subtracting the change or changes in obtained transmission time offsets from the corresponding movement indicators in order to correct the movement indicators for said change or changes in transmission time offsets; and (e) comparing the movement indicators with one or more threshold values in order to determine whether the mobile terminal has moved outside said locale.

Thus the invention overcomes the inherent difficulty found in U.S. Pat. No. 5,969,679, namely the use of propagation delays (which are not receive time offsets), by subtracting corresponding receive time offsets in the first and second sets from one another.

The transmission sources may be individual transmission sources of any type, for example public broadcast radio transmitters or television transmitters. They may also be the transmitters of one or more communications networks such as GSM, W-CDMA or CDMA digital cellular communications systems. The only requirement is that the signals contain embedded components that allow the relative transmission and receive time offsets of the signals to be measured. A mixture of transmission source types may be used in practice.

The step of obtaining at a first time a first set of receive time offsets corresponding to the mobile terminal being located at the centre of the locale may be carried out by the receiver in the terminal itself measuring the said offsets when it is in the centre of the locale.

Alternatively, these receive time offsets may be calculated in a computing node having access to the transmission time offsets of the transmission sources whose signals would be received at the centre of the locale. The list of such sources may be determined in advance or may be calculated on the basis of a propagation model and the known distribution of transmission sources. The calculated first set of receive time offsets may then be sent to the mobile terminal via a data link, or they may be stored within the computing node or sent to another computing node.

The measurements of the receive time offsets of the signals received by the terminal from transmitters of a network may be solely of signals broadcast by the network, in other words there is no requirement for the terminal to send signals to the network. When the network of transmission sources is a communications network, there is no requirement for the terminal to be registered on the network.

Measurements of the receive time offsets may be made more than once over a short period and combined together, for example by averaging, in order to reduce measurement and channel errors.

The step of measuring the receive time offsets may be achieved using signal patterns in each of the signals transmitted by the respective transmission sources. As explained in our WO 00/73813 and WO 00/73814, in the case when the transmission sources are members of a communications network, for example a GSM or WCDMA network, the signal patterns may be e.g. synchronisation bursts broadcast on a control channel, or they may be frame boundaries in the transmitted data streams, or they may be pilot signals.

In synchronised networks, the transmission time offsets of the transmission sources may be stable enough that there is no appreciable change in relative transmission time offset of one transmission source with respect to another between the first and second times. In that case, it is unnecessary to carry out the step of correcting the movement indicators by obtaining and subtracting any changes in transmission time offsets (since they can be assumed to be zero).

However, in unsynchronised networks, the transmission time offsets of the signals radiated by the transmitters may drift slowly with respect to each other. Even in the case where the transmissions are constant because they are controlled by a common clock, derived for example from a communications backbone network, the relative transmission time offsets are arbitrary and unspecified. The relative transmission time offsets of the network transmitters may therefore be measured, either using LMUs as mentioned above or by using the method explained in WO 00/73813 and WO 00/73814. In either case, for each of the corresponding signals received by the terminal at each of the first and second times, the transmission time offsets may be obtained and one subtracted from the other to determine the changes in the transmission time offsets between the first and second times. These changes may be obtained by the terminal from the network, either by point-to-point communication or via broadcast communication.

Alternatively, the slowly-varying transmission time offsets can be modelled using a simple parametric equation. For example, if parameters $\alpha_1$ and $\alpha_2$ represent the rate of change of relative transmission time offset and the second rate of change of relative transmission time offset respectively, each parameter referring to a reference time $T_0$, then an estimate of the change in the relative transmission time offset, $\Delta\tau$, at instant T may be obtained from $$\Delta\tau = \alpha_1(T-T_0) + \alpha_2(T-T_0)^2. \qquad (1)$$

The parameters $\alpha_1$ and $\alpha_2$ may be derived from the timing model of the network and may be transmitted from time to time to the terminal, either by broadcast communication or by point-to-point communication. The terminal may then obtain the changes in the transmission time offsets between the first and second times using the model parameters. Clearly, more terms may be included if required, for example to represent third, fourth, fifth, etc. rates of change of relative transmission time offset. It may also be desirable to represent the value of $\Delta\tau$ using a different model. For example, a better fit may be obtained by including one or more periodic terms in the model. The argument, T, of equation 1 may be the time expressed using an agreed time scale such as Universal Coordinated Time (UTC), or it may be expressed in terms of characteristics of the signals transmitted by the transmitters of the network. For example, T could represent the frame number of the signals received from the serving transmitter. Since the parameters $\alpha_1$, and $\alpha_2$ etc. vary only slowly with time, the value of T could be expressed quite coarsely and would not need to be corrected for time of flight or other short delays.

Changes in the relative receive time offsets corresponding to transmission source n ($RTO_n$) measured by the mobile terminal at the first time ($RTO1_n$) and the second time ($RTO2_n$) are indicative of changes in its position when the expected variations in transmission time offsets ($TTO1_n$, $TTO2_n$), if any, obtained directly or using models such as that of equation 1, have been taken into account. If the terminal stays at the same place, then the measured changes in receive time offsets ($RTO2_n - RTO1_n$) are the same as the changes in the transmission time offsets ($TTO2_n - TTO1_n$). Any significant discrepancy between the measured and expected changes (once measurement errors have been taken into account) therefore indicates that the terminal has moved. A movement indicator $MI_n$ may therefore be defined as $$MI_n = RTO2_n - RTO1_n - TTO1_n + TTO2_n. \quad (2)$$

For example, suppose that the terminal was on the line joining two transmitters, and in between them. Then a movement of 150 meters towards one of them would reduce the receive time offset of the signal received from that transmitter by half a microsecond, and add half a microsecond to the other. Thus the receive time offset measured by the terminal of the signals from one transmitter relative to the other would change by 1 microsecond.

The measured change also depends on the disposition of the transmitters relative to the direction of the movement. For example, in the case just considered, if the terminal were to move in a direction perpendicular to the line joining the transmitters a much smaller change, if any, would be measured. In general, the changes in the measurements of the relative receive time offsets measured by a terminal and corrected for changes in the transmission time offsets, depends on (a) the distance moved, (b) the direction of the movement, and (c) the geometrical disposition (angle and distance) of the transmitters relative to the terminal. The best disposition would be one in which the terminal was surrounded equally by transmitters, for example being at the centre of an equilateral triangle formed by the transmitters, or the centre of a square, etc.

The positions of the transmitters could be sent to the terminal, but this is not necessary in practice. The network, e.g. the SMLC, normally has access to a transmitter position database in order to carry out its positioning calculations using network signals as described above, so is able to determine a set of threshold values of relative receive time offset changes for each transmitter corresponding to the terminal moving from the centre to the edges of a defined locale in several directions. For example, in a particular application it might be sufficient to define just four sets of threshold values corresponding to movement from the centre to the edge in north, south, east and west directions. These sets of threshold values can be supplied to the terminal by any convenient means. For example, they could be pre-programmed into the terminal, or entered manually from the keyboard, or sent from the network to the terminal. In each case the sets of threshold values define the changes, after adjustment for changes in the transmission time offsets, allowed for movement within the given locale. Any change greater than a threshold value can be taken to indicate movement of the terminal to a position which is outside the boundary of the locale.

Movement in any direction from the inside to the outside of a two-dimensional locale requires the relative receive time offsets of at least three transmitters to be measured by the terminal. In practice, many more can be used to add redundancy and hence robustness to the system. Movement along a line can be monitored using just two transmitters in the minimum case, as described above.

The sets of receive time offsets created in the terminal at the first or second times may be stored in the terminal or may be sent from the terminal over a link to a remote node for storage. The calculation to determine whether the terminal has moved outside a locale may also be performed in the terminal or elsewhere. For example, in a home-zone billing application, it may be convenient to carry out the calculation within the terminal and to notify the network billing centre whether the terminal is within the home zone or outside of it. In another example, this calculation is performed in a computing node connected to the network, and the measurements made by the terminal are sent to it. In yet another example, the calculations are made, either within the terminal or remote from it, for more than one locale. In this case, the locales may join together to form a track or route, and the calculations may be used to determine whether the terminal has deviated away from a pre-determined path.

The invention also includes apparatus arranged or adapted to carry out the method of the invention. The apparatus may consist of a mobile terminal of a communications network.

BRIEF DESCRIPTION OF THE DRAWINGS

The invention and an example of the system in which it may be deployed will now be further described with reference to the accompanying drawings, in which.

DETAILED DESCRIPTION OF THE EXAMPLES

Figure 1:
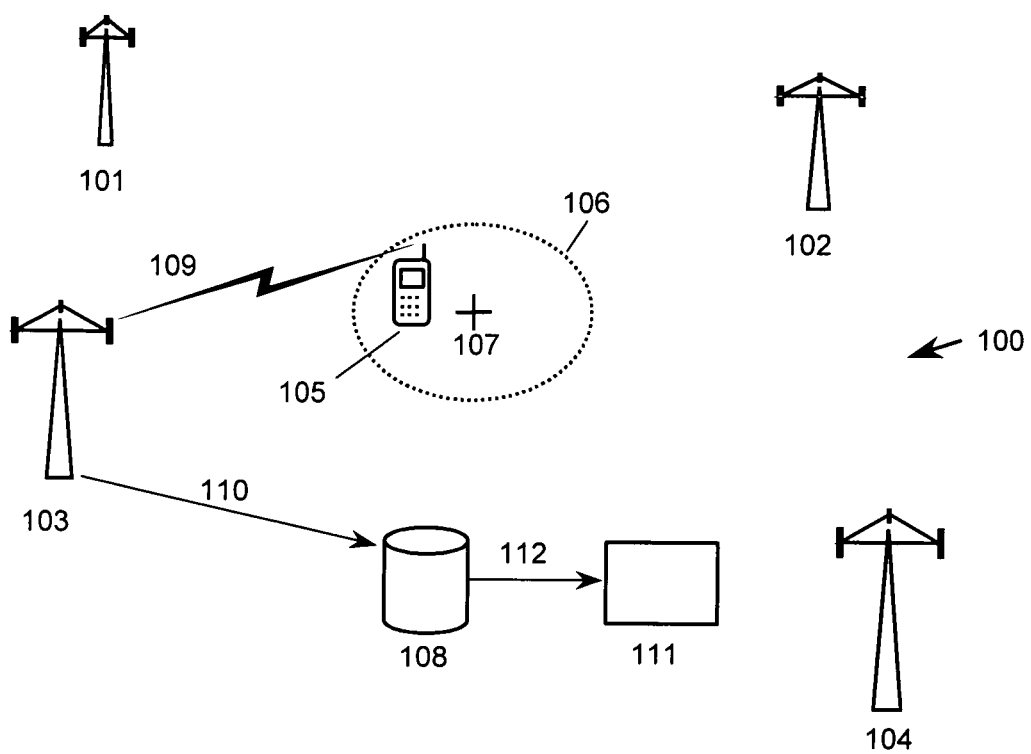
FIG. 1 is a diagram illustrating the overall architecture of a system in which the invention is deployed.

FIG. 1 shows an example of a system embodying the invention and, in particular, shows the overall architecture. A terminal 105 receives the signals broadcast by the base transceiver stations (BTSs) 101-104 of a terrestrial network 100, in this case a GSM network. Terminal 105 is shown located, at a first time, within a locale defined by boundary 106 centred on point 107. In effect, the locale is determined by the position of the terminal at the first time.

Figure 2:
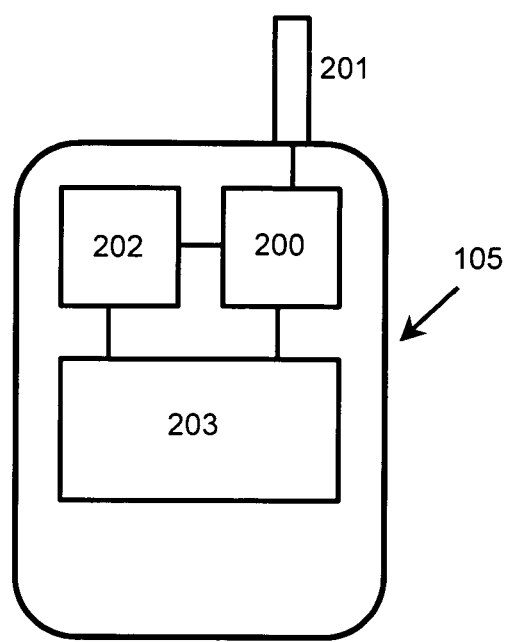
FIG. 2 shows the relevant elements of a mobile terminal.

FIG. 2 shows the relevant functional elements of the terminal 105. The GSM signals radiated by network 100 are picked up by an antenna 201 and passed to a receiver module 200. The receiver module 200 incorporates the front-end, mixers, local oscillators, IF sections, filters, digitisers, and processors usually associated with such a terminal and these are not shown explicitly in the figure. A clock module 202 supplies a clock signal to the receiver module 200 with respect to which the receiver module 200 is able to measure the times of receipt of signatures within the signals received from transmitters of the network 100. Connected also to the receiver module 200 is a general-purpose processor 203, having memory for storage and running a software program for carrying out the method of the invention.

Figure 3:
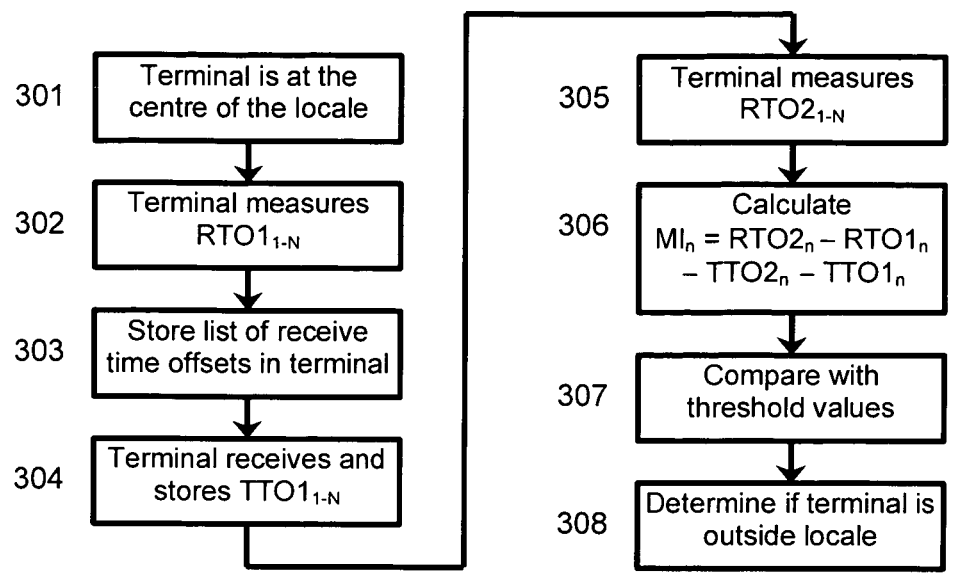
FIG. 3 is a flow diagram of the process steps in one example of the invention.

A flow diagram showing the steps of the process according to one example of the invention is shown in FIG. 3. At the first time (step 301) the terminal 105 is, by definition, at the centre 107 of a locale defined by boundary 106. Here it makes measurements (step 302) of the times of receipt (receive time offsets, RTOs) of the signals received from as many transmitters 101-104 of the network 100 as it can. These times of receipt may be measured, using well-known techniques, relative to one of the signals, say that of the serving cell 101, or relative to another reference such as a timing signal derived from the clock 202 within the terminal 105. In either case, the (relative) receive time offset of any pair of signals, such as those from transmitters 103 and 104, may be obtained by finding the difference between the corresponding measured times of receipt. The list of receive time offsets is then stored. In one embodiment, the list is stored (step 303) within the general purpose processor 203 in the terminal 105. In another embodiment (not shown in the flowchart), the list is sent to an external storage node 108 via links 109 and 110 (see FIG. 1).

In an alternative embodiment, a computing node, which has access to the a database of the geographic positions of the transmission sources, the position of the centre of the locale, and a list of the transmission time offsets of the transmission sources (which may be assumed to be zero if the transmission sources are synchronised with each other), calculates the first set of receive time offsets of those signals expected to be measured by a terminal at the centre of the locale. This first set may then be transferred to the terminal via a data link or any other convenient means.

As terminal 105 moves around and as explained above, the relative receive time offsets vary. If the network is synchronised, or has its transmitter oscillators locked together, the measured values can be used to infer movement of the terminal directly. However in the more general case, as with networks based on GSM or W-CDMA systems, the transmission time offsets of the signals change slowly with time. This change needs to be removed from the measured variation. In one embodiment, the transmission time offsets (TTOs) of the neighbour cells surrounding each serving cell are obtained from an SMLC or LMU and, periodically, broadcast or sent directly to the terminal 105. The terminal 105 receives these messages (step 304) and stores the latest values in its memory. At the first time, the terminal 105 looks up the values of transmission time offsets stored in its memory and stores them, either in the terminal or elsewhere, together with the corresponding measured receive time offsets.

In another embodiment, the transmission time offsets, or the changes in the transmission time offsets, are modelled as previously described (see for example equation 1) using one or more parameters. These parameters are broadcast or sent directly to the terminal 105 from the network 100. The time of day of the first time is noted and stored with the measured receive time offsets.

At the second time, when it is desired to determine whether the terminal 105 is still within the locale 106, a second set of receive time offsets is measured (step 305). In one embodiment, a calculation (step 306) is made within the terminal. In another, the second set is sent to a remote device 111 via links 109, 110 and 112 where the calculation is made. In either case, the first set of measurements is retrieved from storage and the corresponding values are subtracted from those in the second set. Adjustments are also made for the changes in transmission time offsets, either by using the values broadcast by the network, or by estimating them using the model and parameters. In a synchronised network, for example a CDM network, the changes in transmission time offsets are known to be small enough to ignore, so that this adjustment is not required.

The adjusted receive time offset differences are now compared (step 307) with threshold values held within the terminal. These values, which may be pre-programmed into the terminal 105, programmed into the terminal using the terminal keyboard (not shown), or else sent to it via the network 100, are the expected differences for movement from the centre 107 of the locale to the edges 106 in various directions, sufficient to define the boundary. The determination (step 308) that the terminal 105 has moved outside of the boundary 106 of the locale may be made on the basis of one or more of the measured adjusted differences exceeding the corresponding threshold values. The information may be provided to the terminal for use automatically within the terminal, and/or to the terminal's user and/or sent to the network for use elsewhere.

The invention claimed is:

1. A method of determining whether a mobile terminal has moved outside a given locale, said terminal including a receiver able to measure relative receive time offsets of the signals received by the receiver from one or more transmission sources of an unsynchronized transmission system, the relative receive time offsets corresponding to differences in the times of receipt of signals at the receiver from a plurality of the transmission sources relative to at least one of the signals or to a reference signal, the method comprising the steps of:
    (a) obtaining at a first time a first set of one or more relative receive time offsets corresponding to said receiver located at the centre of the locale;
    (b) measuring, at a second time when it is desired to determine whether the mobile terminal has moved outside said locale, a second set of one or more relative receive time offsets of the signals from at least one of the transmission sources, the relative receive time offset of which is included in the first set;
    (c) calculating one or more movement indicators by subtracting the corresponding relative receive time offsets in the first and second sets from one another;
    (d) if the transmission sources are unsynchronised, obtaining the change or changes, in transmission time offsets of the signals transmitted by at least one transmission source relative to a reference or to another transmission source, between the first and second times, and adding or subtracting the change or changes in obtained transmission time offsets from the corresponding movement indicators in order to correct the movement indicators for said change or changes in transmission time offsets; and
    (e) comparing the movement indicators with one or more threshold values in order to determine whether the mobile terminal has moved outside said locale.

2. A method according to claim 1, wherein the step of obtaining at a first time a first set of relative receive time offsets corresponding to the mobile terminal being located at the centre of the locale is carried out by the receiver in the terminal itself measuring the said offsets.

3. A method according to claim 1, wherein the step of obtaining at a first time a first set of relative receive time offsets corresponding to the mobile terminal being located at the centre of the locale comprises calculating said relative receive time offsets in a computing node having access to the transmission time offsets of the transmission sources whose signals would be received at the centre of the locale.

4. A method according to claim 3, wherein a list of the transmission sources whose signals would be received at the centre of the locale is determined in advance.

5. A method according to claim 3, wherein a list of the transmission sources whose signals would be received at the centre of the locale is calculated on the basis of a propagation model and the known distribution of transmission sources.

6. A method according to claim 3, wherein the calculated first set of relative receive time offsets is sent to the mobile terminal via a data link, stored within the computing node or sent to another computing node.

7. A method according to claim 2, wherein the step or steps of measuring the time of receipt of the signals received by the terminal from transmission sources each includes making measurements more than once over a short period and wherein the measurements are combined.

8. A method according to claim 1, wherein any changes in the transmission time offsets between the first and second times are obtained by the terminal from a transmission source by point-to-point communication or via broadcast communication.

9. A method according to claim 1, wherein the changes in the transmission time offsets are modelled using a parametric equation.

10. A method according to claim 1, wherein one or more of the sets of relative receive time offsets at the first or second times are stored in the terminal.

11. A method according to claim 2, wherein the sets of relative receive time offsets created in the terminal at the first or second times are sent from the terminal over a link to a remote node for storage.

12. A method according to claim 1, wherein the step of comparing the movement indicators with one or more threshold values to determine whether the terminal has moved outside said locale is performed in the terminal.

13. A method according claim 1, wherein the step of comparing the movement indicators with one or more threshold values to determine whether the terminal has moved outside said locale is performed in a computing node connected to a network of the transmission sources, and the transmission time offsets or changes in transmission time offsets determined in the terminal are sent to one of the computing node and a calculation node connected to the computing node.

14. A communications system arranged or adapted to carry out the method of claim 1.

15. Apparatus for determining whether a mobile terminal has moved outside a given locale, the apparatus comprising
a mobile terminal capable of measuring relative receive time offsets corresponding to the differences in the times of receipt of the signals received by the terminal from a plurality of the transmitters of an unsynchronized transmission system relative to a reference or to each other, and creating sets of one or more relative receive time offsets at first and second times;
calculation means for calculating one or more movement indicators by subtracting corresponding relative receive time offsets in the first and second sets from one another;
means for determining if the transmission sources are unsynchronised and, if they are, obtaining the change or changes, in transmission time offsets of the signals transmitted by at least one transmission source relative to a reference or to another transmission source, between the first and second times, and adding or subtracting the change or changes in obtained transmission time offsets from the corresponding movement indicators in order to correct the movement indicators for said change or changes in transmission time offsets; and
means for comparing the movement indicators with one or more threshold values in order to determine whether the mobile terminal has moved outside said locale.

16. Apparatus according to claim 15, including means for obtaining the change or changes, in transmission time offsets of the signals transmitted by at least one transmission source relative to a reference or to another transmission source, between the first and second times, and adding or subtracting the change or changes in obtained transmission time offsets from the corresponding movement indicators in order to correct the movement indicators for said change or changes in transmission time offsets.

17. Apparatus according to claim 16, including means within the terminal for obtaining the changes in the transmission time offsets between the first and second times by point-to-point communication or via broadcast communication.

18. Apparatus according to claim 16, wherein the changes in the transmission time offsets are modelled in the terminal using a parametric equation.

19. Apparatus according to claim 15, wherein the threshold values are pre-programmed into the terminal.

20. Apparatus according to claim 15, wherein the means for comparing the movement indicators with one or more threshold values is arranged to receive threshold values entered manually from a keyboard or sent from one or more of said transmission sources.

21. Apparatus according to claim 15, including storage means for storing at least one set of relative receive time offsets.

22. Apparatus according to claim 15, comprising a terminal of a communications network.

23. Apparatus according to claim 15, further including means for determining if the transmission sources are unsynchronised and, if they are, obtaining the change or changes, in transmission time offsets of the signals transmitted by at least one transmission source relative to a reference or to another transmission source, between the first and second times, and adding or subtracting the change or changes in obtained transmission time offsets from the corresponding movement indicators in order to correct the movement indicators for said change or changes in transmission time offsets.

* * * * *